United States Patent
Paris et al.

(10) Patent No.: US 10,717,351 B2
(45) Date of Patent: *Jul. 21, 2020

(54) KNITTED WIRE CARRIER FOR WEATHER SEAL INSERT SUPPORT WITH REINFORCEMENT

(71) Applicant: Hope Global, division of NFA Corp., Cumberland, RI (US)

(72) Inventors: Roland L. A. Paris, Erbree (FR); Ildeberto Rosa, Pawtucket, RI (US); Jesus Aguilar, Cumberland, RI (US)

(73) Assignee: Hope Global, division of NFA Corp., Cumberland, RI (US)

(*) Notice: Subject to any disclaimer, the term of this patent is extended or adjusted under 35 U.S.C. 154(b) by 326 days.

This patent is subject to a terminal disclaimer.

(21) Appl. No.: 15/488,428

(22) Filed: Apr. 14, 2017

(65) Prior Publication Data

US 2017/0297420 A1    Oct. 19, 2017

Related U.S. Application Data

(60) Provisional application No. 62/324,114, filed on Apr. 18, 2016.

(51) Int. Cl.
  *B60J 10/18*   (2016.01)
  *D04B 21/14*   (2006.01)
  *D04B 21/20*   (2006.01)

(52) U.S. Cl.
  CPC .............. *B60J 10/18* (2016.02); *D04B 21/14* (2013.01); *D04B 21/20* (2013.01); *D10B 2401/062* (2013.01); *D10B 2403/0311* (2013.01)

(58) Field of Classification Search
  CPC .......... B60J 10/18; D04B 21/20; D04B 21/14; D10B 2401/062; D10B 2403/0311
  See application file for complete search history.

(56) References Cited

U.S. PATENT DOCUMENTS 5,416,961 A    5/1995   Vinay
6,150,003 A    11/2000  McCutchan, Jr.
(Continued)

FOREIGN PATENT DOCUMENTS

CN    102264990 A    11/2011
CN    104246076 A    12/2014
(Continued)

*Primary Examiner* — Cephia D Toomer
(74) *Attorney, Agent, or Firm* — Loginov & Associates, PLLC; William A. Loginov

(57) ABSTRACT

This provides a system and method for constructing and employing a wire carrier for use in reinforcing the attachment channel of weather seals that includes an expansion and compression resisting element located along at least one bending axis of the carrier when it is folded and molded into the attachment channel of the weather seal. The resisting element can be combined with warp yarns that allow limited expansion and compression along other axes, but in combination with the element prevent collapse of the seal that results in and uneven surface and/or visible kinks. The resisting element can comprise at least one undulating (sinusoidal) wire that is attached (e.g. by welding, soldering, etc.) to the individual crossing carrier wires. Alternatively, the resisting element can comprise another type of structure, such as a thin metal or polymer strip. Likewise, the undulating wire(s) can be constructed from a polymer.

18 Claims, 11 Drawing Sheets

(56) References Cited

U.S. PATENT DOCUMENTS

| | | | |
|---|---|---|---|
| 6,461,713 B2 | 10/2002 | King | |
| 7,028,510 B1 * | 4/2006 | DaRosa | D04B 21/20 66/170 |
| 10,246,803 B2 * | 4/2019 | Aguilar | D04B 21/12 |
| 2002/0102383 A1 | 8/2002 | King | |
| 2017/0073862 A1 | 3/2017 | Aguilar et al. | |

FOREIGN PATENT DOCUMENTS

| | | | |
|---|---|---|---|
| EP | 0665314 | A2 | 8/1995 |
| EP | 3144423 | A1 | 3/2017 |

* cited by examiner

KNITTED WIRE CARRIER FOR WEATHER SEAL INSERT SUPPORT WITH REINFORCEMENT

RELATED APPLICATIONS

This application claims the benefit of U.S. Provisional Application Ser. No. 62/324,114, filed Apr. 18, 2016, entitled KNITTED WIRE CARRIER FOR WEATHER SEAL INSERT SUPPORT WITH REINFORCEMENT, the entire disclosure of which is herein incorporated by reference.

FIELD OF THE INVENTION

This invention relates to wire carriers having a knitted stitching used as backing for elastomeric weather seals in automotive and other applications, such as electrical cabinets where maintaining weather impermeability is a critical attribute.

BACKGROUND OF THE INVENTION

Knitted wire carriers are commonly used in the area of automotive weather seals, among other uses. Generally, such carriers consist of a continuous wire weft formed into a serpentine propeller pattern with rounded ends. The ends join together a series of approximately propeller-shaped or parallel weft segments (limbs) upon which a plurality of warp threads is knitted. This type of knitted wire carrier is used as a reinforcing frame for elastomeric seals that are produced by extrusion and other continuous-forming processes. Such seals are often used in automotive and other vehicle applications.

The manufacture of extruded weather seals involves the application of substantial forming pressure to the wire carrier. The warp threads in many examples are applied in clusters or strips, all of which are designed to maintain the serpentine (also informally termed "zig-zag") wire weft the appropriately spaced orientation during the formation process. Absent these warp threads, the wire would tend to stretch and deform, generating an inferior or unusable finished seal product.

Wire carriers are an efficient mechanism for constructing a weather seal. However in certain application they experience excess compressibility or elongation—for example when the weather seal is fitted around a tight-radius corner. That is, the seal compresses or stretches and does not maintain the desired, conforming profile on the door, trunk, etc.

One prior art approach to reduce excess compressibility and elongation in weather seals is to reinforce the elastomeric seal element with a perforated metal (e.g. low carbon steel) strip. Such a strip 100 in an unfolded orientation is shown by way of background in FIG. 1. The specific geometry of the strip 100, as well as its overall width, length, thickness, are highly variable depending on the weather seal application and desired performance characteristics. In an embodiment, the strip 100 has an overall width SW of approximately 20-65 millimeters and a thickness (perpendicular to the page of the figure) of between approximately 0.3 and 0.76 millimeters (e.g. 0.45 millimeters). The exemplary strip 100 includes a series of regular edge slots 110, formed along each opposing edge, having a width WS of between approximately 1 and 3 millimeters, and a series of central slots 120 offset from the edge slots 110 as shown. The strip can be formed into a desired shape (e.g. folding, stretching, etc.) and molded into a weather seal. The completed seal is capable of bending around sharp corners without significant puckering, wrinkling, compression or elongation.

Disadvantageously, this perforated, low-carbon steel strip requires a large quantity of sheet metal to produce (weight-per-unit-of-length) and employs involved stamping or cutting equipment, dies, etc.

SUMMARY OF THE INVENTION

This invention overcomes disadvantages of the prior art by providing a system and method for constructing and employing a wire carrier for use in reinforcing the attachment channel of weather seals that includes an expansion and compression resisting element located along at least one bending axis of the carrier when it is folded and molded into the attachment channel of the weather seal. The resisting element can be combined with warp yarns that allows limited expansion and compression along other axes, but in combination with the element prevent collapse of the seal that results in and uneven surface and/or visible kinks. The resisting element can comprise at least one undulating (sinusoidal) wire that is attached (e.g. by welding, soldering, etc.) to the individual crossing carrier wires. Alternatively, the resisting element can comprise another type of structure, such as a cable, or a thin metal or polymer strip. Likewise, the undulating wire(s) can be constructed from a polymer. In general, the resisting element can be placed along a side of the strip that is proximate to the mounting fin of the underlying support structure (e.g. the opening or door of an automotive body. It resides along the neutral axis with respect to the weather seal.

In an illustrative embodiment, a knitted wire carrier for use in a weather seal is provided. The carrier includes a wire weft formed in a serpentine pattern and defining a width between alternating edge bends perpendicular to an elongated length. A plurality of knitted warp yarns extend in the direction of the elongated length and are located at positions along the width of the wire weft. At least a first expansion and compression resisting element I also provided at a location along a width of the weft that generates a desired bending characteristic in the weather seal that is generally free of collapse. Illustratively, the wire weft comprises a steel wire and the first expansion and compression resisting element comprises a steel wire. Alternatively, the first expansion and compression resisting element comprises a strip defining a width thereof greater than a thickness thereof. The wire carrier can be coated with an adhesive material that maintains the warp yarns in a desired position on the wire weft. The adhesive material can comprise a latex coating. At least a second expansion and compression resisting element can also be provided. The first expansion and compression resisting element can comprise a wire arranged in a woven, sinusoidal pattern with respect to adjacent wire wefts and the second expansion and compression resisting element can also comprise a wire arranged in an opposite woven, sinusoidal pattern with respect to the wire wefts relative to the first expansion and compression resisting element. Illustratively, the second expansion and compression resisting element can be located at a spacing along the width of the wire weft from the first compression and expansion-resisting element. In an embodiment, the first expansion and compression resisting wire is approximately centered along the width of the wire, or it can be located off-center relative to the width of the wire, whereby the first expansion and compression resisting element is located, when the wire carrier is folded into a U-shape, adjacent to a side of the folded U-shape. In embodiments, the first expansion and compression resisting wire can be constructed from a non-metallic material. Illustratively, the first expansion and compression resisting element is adhered to the wire weft. In embodiments, the first expansion and compression resisting element can adhered by at least one of welds, spot welds, solder, adhesive, fusion and lockstitching.

In various embodiments, a weather seal and/or other type of seal (e.g. an appliance door seal) can be provided with the knitted wire carrier described above, folded into a U-shape to reinforce a mounting channel of the seal. Thus, the seal can be constructed and arranged for attachment in at least one of a vehicle and a moisture-tight cabinet (e.g. an appliance, a sealed chest, a safe, etc.).

In an embodiment, at least one reinforcing fiber is located adjacent to at least one of the warp yarns that provides enhanced elongation resistance. Such fibers are used to compensate for an absence of a sufficient number of warp yarns at the particular location along the weft. The fibers can be any acceptable material including monofilament polymer (nylon, Dacron, etc.), fiberglass and/or aramid. The reinforcing fibers can be located in a plurality of positions along the weft.

In an embodiment, a method for constructing wire carrier with a knitting machine is provided. This method includes the steps of feeding and forming a wire into a wire weft defining a serpentine pattern having a width between alternating edge bends perpendicular to an elongated length. Warp yarns are knitted so as to extend in the direction of the elongated length, and are located at positions along the width of the wire weft using knitting needles in a needle bed. A first expansion and compression resisting element is fed into engagement with the wire weft. The resisting element can be adhered to the wire weft, or it can be located so that it is adjacent to the weft and is held in place with the weft/carrier when these components are molded into a weather seal. Illustratively, the resisting element can comprise a wire and the step of adhering includes applying a weld between the resisting element and the wire weft.

BRIEF DESCRIPTION OF THE DRAWINGS

The invention description below refers to the accompanying drawings, of which.

DETAILED DESCRIPTION

Figure 2:
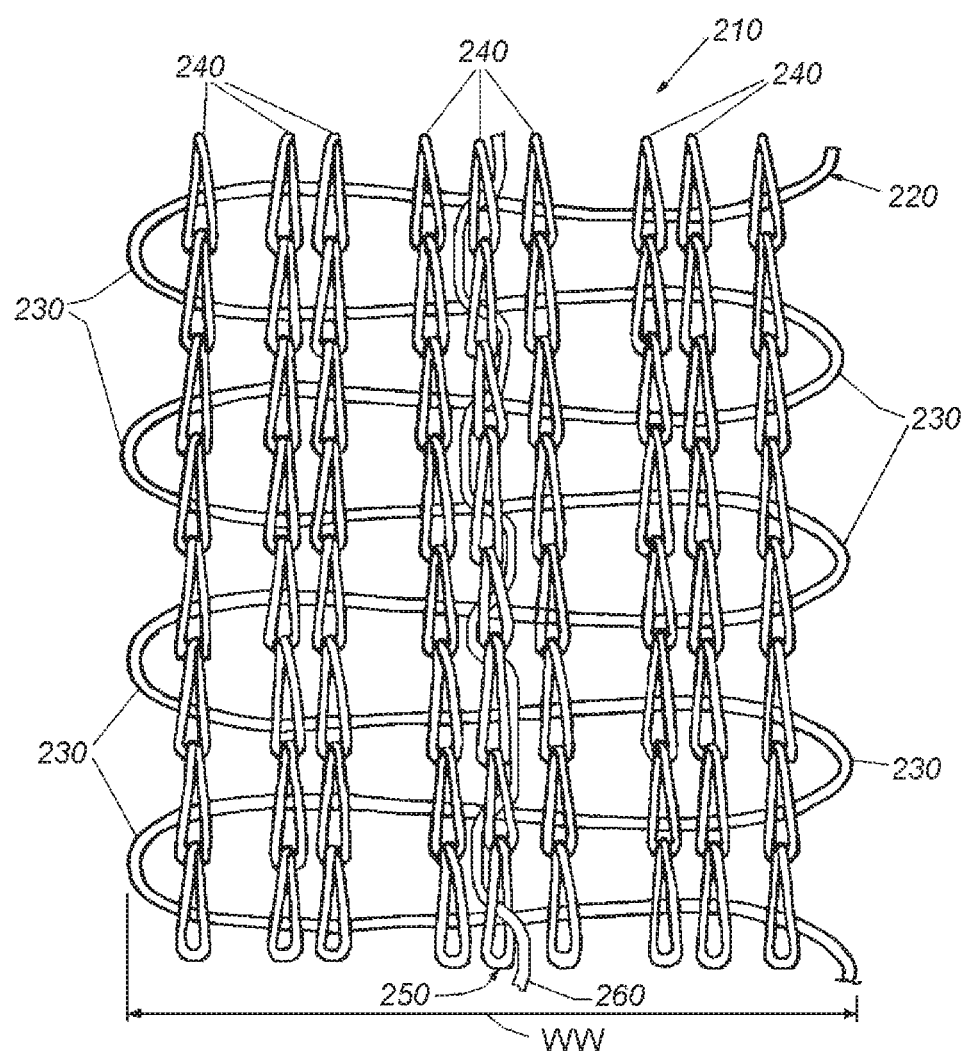
FIG. 2 is a diagram of a knitted wire carrier including an expansion and compression resisting element defining a metal-wire lockstitch, located around the center of the carrier width, for use in reinforcing an automotive weather seal according to an embodiment.

A segment knitted wire carrier 210 according to an embodiment of this invention is shown in FIG. 2. This carrier, and various alternatives, is/are also described in commonly assigned U.S. patent application Ser. No. 14/854,036, entitled KNITTED WIRE CARRIER FOR WEATHER SEAL INSERT SUPPORT WITH LOCKSTITCHED REINFORCING WIRE, filed Oct. 9, 2015, the teachings of which are expressly incorporated herein by reference as useful background information. The exemplary carrier 210 consists of a serpentine bent wire 220. This wire can be constructed from a variety of deformable materials. For example the wire 220 can be low-carbon steel, galvanized steel or aluminum alloy having a diameter of between approximately 0.02 and 0.045 inch (approximately 0.5 millimeters to 1.14 millimeters). In certain embodiments, the wire 220 can be coated with an anti-rust/anti-corrosion coating or plating. When manufactured, the wire 220 is bent generally in a planar fashion, and is formed into a continuous strip by a swinging, back and forth motion (for forming the weft) of a knitting machine that can be conventional in design. The strip has a generally constant width WW between the bend apices 230 on each opposing side. In one example, that width WW is approximately 1¼-1⅝ inches (31.75 to 42.54 millimeters). However, the width WW of the wire carrier is highly variable depending, in part, upon the selected application for which it is used.

The bent wire 220 essentially defines the weft, about which a series of warp yarns 240 are knitted. These warp yarns, as discussed above, maintain the relative shape and spacing of the bent wire segments and provide a further substrate for elastomeric/polymeric weather seal material (not shown) to adhere to the carrier 210. In this example, the warp yarns 240 are generally specifically spaced divided into various patterns across the width. In this embodiment, the yarns are constructed from polyester or polypropylene, with a Denier of approximately 1000 and between approximately 140-300 filaments. Note that this specification for warp yarns is only exemplary and that a wide range of materials, denier and filament counts are expressly contemplated.

By way of non-limiting example, the wire's bend apices 230 can be connected to curved wire bend segments that define a wider spread than the spread between adjacent central wire segments. By having a wider spread between adjacent wires near the ends than in the center, the carrier defines the general outline appearance of a "propeller" blade. This conventional shape is used in part, to maintain the edge warps near or at the apices since they must "climb over" the widened spread between segments to creep into the middle. Additionally, the warps can be adhered to the carrier using, for example a layer of latex that holds the warps in place on the wire 220. The latex can be applied after the knitting process is completed using a spray nozzle or a dip tank.

Notably, the center warp yarn 250 can be locked using a lockstitch wire 260 that weaves in and out of the knit. This lock stitch wire 260 is illustratively constructed from 0.02-inch (0.5 millimeter) steel wire. The diameter of the wire 260 can be highly variable (e.g. 0.3-0.76 millimeter) in alternate embodiments. The wire lockstitch provides stiffness that serves to resist both expansion and compression of the carrier when it is encased in weather seal polymer and bent around shapes of various curvatures. That is, the lockstitch wire 260 imparts internal stiffness in the direction of elongation and compression of the weather seal. This stiffness from the wire expansion and compression resisting element can limit or prevent flexibility between segments of the bent wire 220. As described further in the incorporated reference, a plurality of lockstitch wires can be employed at various locations along the width of the carrier. One or more lockstitch wires can, likewise, be employed at particular positions (e.g. off-center) along the carrier width. This can assist in biasing the bend in the finished weather seal.

Figure 3:
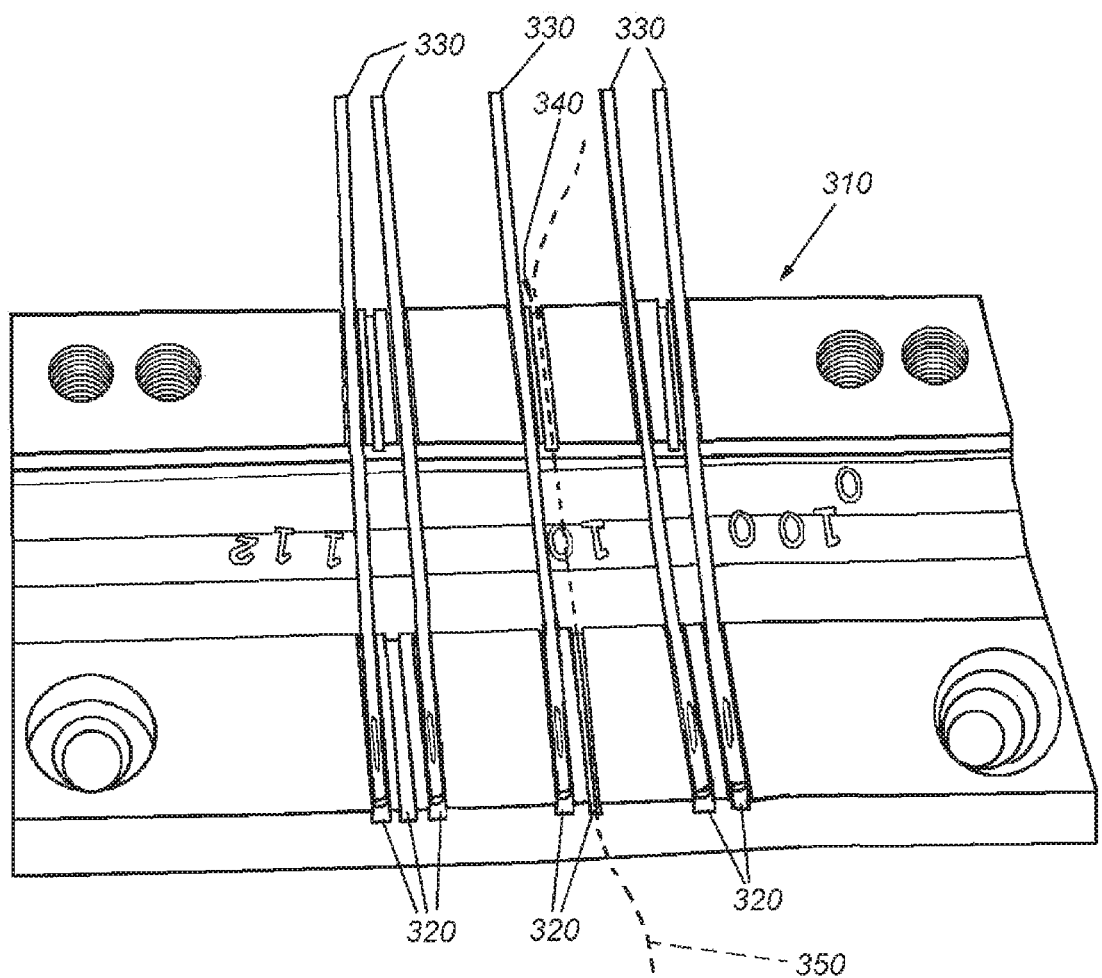
FIG. 3 is a perspective view of a knitting weaving needle bed showing an empty slot for placement of a wire lockstitch according to the embodiment of FIG. 2.

As described further below, the expansion and compression-resisting wire of the above-described embodiment can be secured to the carrier in various ways. In embodiments, it can be spot-welded to the wire carrier. Alternatively, the wire can be separately tied, woven through a warp yarn, and/or adhesives can be employed, so that the carrier can be produced without (free of) welding the expansion and compression-resisting wire to the carrier wire 220. A weaving needle bed block 310 of conventional design is shown in FIG. 3. The bed block 310 includes slots 320 that hold stationary conventional knitting needles 330 used to knit the warp yarns to appropriate location along the width of the wire carrier. The general setup of the knitting machine facilitates use of an empty slot 340 of the weaving needle bed block 320 to guide the lock stitch wire (represented by dashed-line 350). This can be termed a "dummy needle". The wire (350) is drawn into the overall carrier knit as it is paid out of the knitting machine. An expansion and compression resisting wire can be added to the carrier at the same time or after the warp yarns are knitted to the carrier. The wire can reside on a driven (or non-driven) feed roll and is fed to the carrier as it moves out of the knitting machine. This arrangement should be clear to those of skill in the art.

Figure 4:
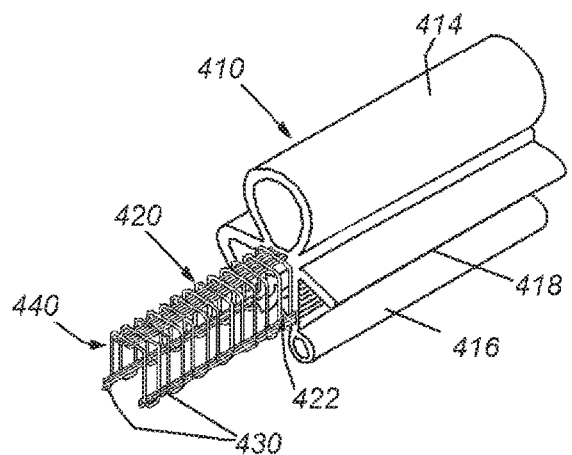
FIG. 4 is a fragmentary, exposed perspective view of a weather seal (e.g. an automotive trunk seal) with a molded-in, folded wire carrier that is free of any expansion and compression resisting element according to the prior art.
Figure 5:
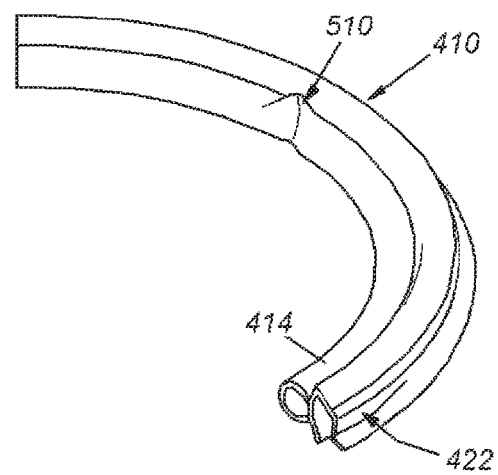
FIG. 5 is a fragmentary perspective view of the weather seal of FIG. 4, shown in a bend configuration, including a kink, due to collapse of the wire carrier.

With reference to FIG. 4, and as described above, a typical automotive weather seal—in this example a trunk lid seal 410—is shown with the knitted wire carrier 420 exposed. The wire carrier 420 is folded into a U-shape to provide stiffness to the associated channel 422 of the seal 410. This allows the channel 422 to be secured to a mounting fin formed on the edge of the trunk or other auto body structure (not shown). The folded wire carrier 410 is molded into the seal 410 as shown, and the seal can include a plurality of bulbs/lobes 414, 416, edge veins 418 and/or other protuberances that collectively define its cross-sectional profile. The lobes/bulbs can be filled with elastomeric foam or another pliable substance or can be hollow. The seal's cross-sectional profile is adapted to the particular sealing task. The wire carrier 420 contains knitted warp yarns 430 and 440 that are located, respectively, along the sides and top of the carrier. The warp yarns can be located and grouped so that they provide a certain bending bias to the seal 410. Such bending is shown in FIG. 5. Note that the yarns lack resistance against compression so that a bend of a sufficiently small radius causes a collapse of the seal and a visible kink 510 at the lobe/bulb 414.

Figure 6:
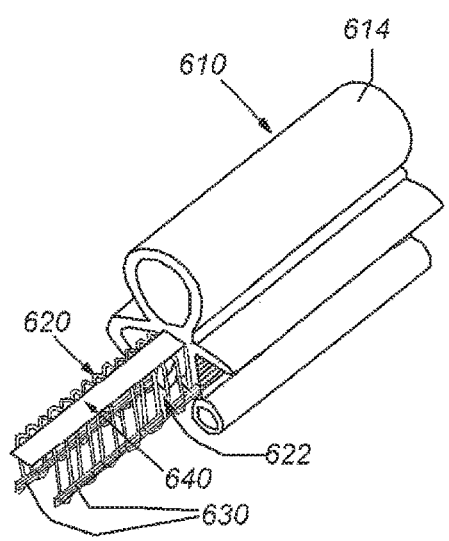
FIG. 6 is a fragmentary, exposed perspective view of a weather seal (e.g. an automotive trunk seal) with a molded-in, folded wire carrier having an expansion and compression resisting element along its top side (bottom of the U-shape) according to an embodiment.

Use of a wire as described above resists undesirable compression (and expansion) of the carrier when embedded in the seal. The carrier can be embedded in a seal as the seal is extruded. More generally, according to embodiments herein, the wire carrier can be provided with at least one expansion and compression resisting element that is secured to the wires (weft) of the carrier. The at least one expansion and compression resisting element can prevent or resist expansion and compression of the carrier before, during, and after the extrusion process. A seal 610 (e.g. a trunk seal) is shown in FIG. 6 with a molded-in wire carrier 620 that includes a secured resisting element 640 in addition to (e.g.) side-mounted warp yarns 630. The expansion and compression resisting element 640 is, in this embodiment, mounted along the top of the folded carrier 610. This region defines the central width of an unfolded carrier as described above.

Figure 7:
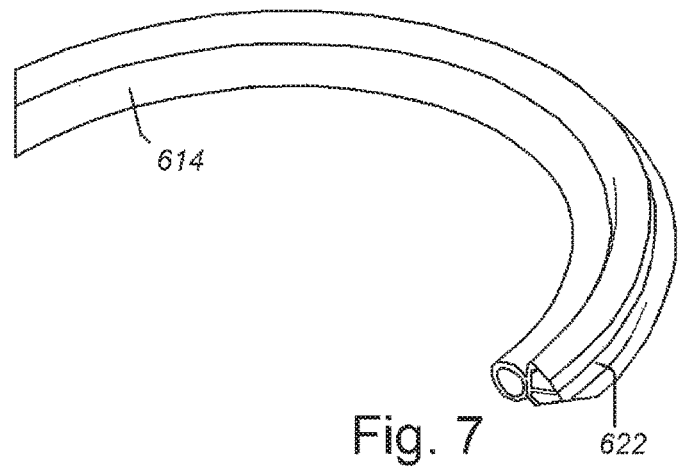
FIG. 7 is a fragmentary perspective view of the weather seal of FIG. 6, shown in a bend configuration, in which the expansion and compression resisting element in the wire carrier avoids collapse and kinking of the seal.

In various embodiments, the expansion and compression resisting element 640 can be constructed from a metal such as steel or aluminum alloy, or from an appropriate polymer. The resisting element 640 can be provided as a cylindrical (or other cross-section) wire, or as a strip of material. As shown, the resisting element 640 is located along the top side (bottom of the U-shape) of the folded wire carrier. The resisting element herein defines a member with appropriate width and thickness that can be (e.g.) spot welded or otherwise joined to the wires of the carrier 610. Various arrangements for the resisting element are described below. As also described below, the expansion and compression resisting element can be located at other positions so as to bias the bend of the seal, or it can be located at a plurality of positions along the width of the wire carrier. The placement of the resisting element along the top, allows the spine of the seal channel 622 to define a neutral axis that bends as shown in FIG. 7 in a manner that is free of kinks in its lobe/bulb 614 due to collapse (compression) of the carrier. In general, the resisting element 620 is located proximate to the mounting fin of the auto body. It provides a backing surface at the top end of the seal channel 622 that bends to conform to the shape of the body in a manner that is free of compression or expansion, while the more remote yarn-secured ends of the carrier (at the bottom sides of the seal channel) are more free to expand during bending, thereby allowing the overlying seal to stretch in these regions for a tight and continuous fit about the auto body.

Figure 8:
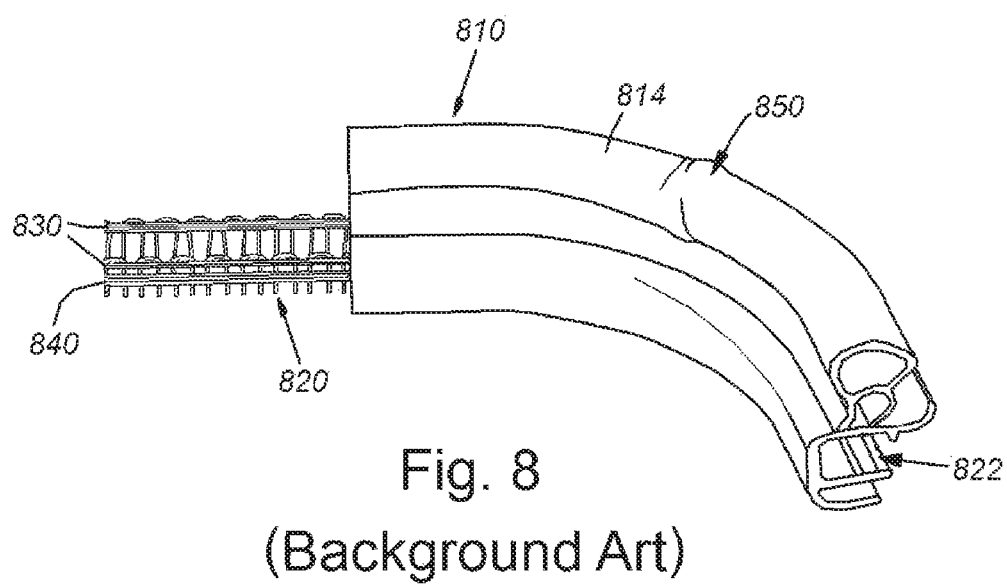
FIG. 8 is a fragmentary, exposed perspective view of a weather seal (e.g. an automotive door seal) with a molded-in, folded wire carrier that is free of any expansion and compression resisting element according to the prior art, in which a kink occurs due to collapse of the wire carrier at a bend.

FIG. 8 shows another example of a weather seal for use (e.g.) in an auto body door arrangement. The wire carrier 820 having conventional warp yarns 830 and 840 is molded into the seal 810 to define a channel 822. As described above, a bend of a sufficiently small radius causes the lobe/bulb 814 to compress and collapse, thereby defining the depicted kink 850.

Figure 9:
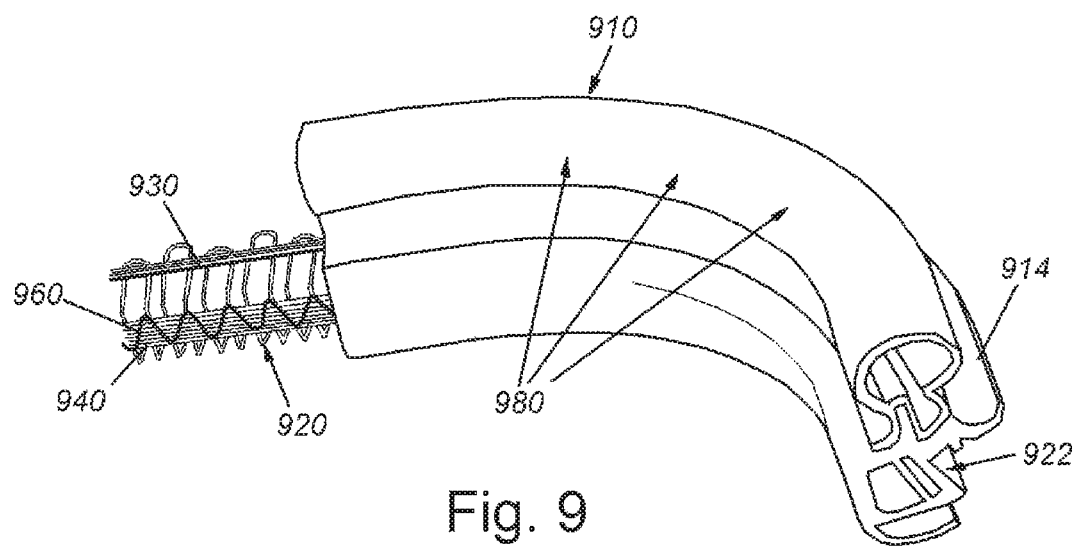
FIG. 9 is a fragmentary, exposed perspective view of a weather seal (e.g. an automotive door seal) with a molded-in, folded wire carrier that includes an expansion and compression resisting element according to an embodiment arranged along a side of the folded wire carrier, which is free of collapse and kinks at a bend.

As shown in FIG. 9, a weather seal 910 with the exemplary door seal profile of FIG. 8 can be combined with a molded-in wire carrier 920 that contains at least one or a plurality of expansion and compression resisting element 960. In this embodiment, the undesirable collapse and kink 850 of FIG. 8 is avoided by locating the resisting element 960 adjacent to top of the U in the folded wire carrier 910 thereby defining a neutral axis along the top of the folded wire carrier, along the corresponding top of the mounting channel 922. The sides of the U include warp yarns 930 and 940 as described above. The top can also include yarns as appropriate. As shown, the geometry of the seal 910 is such that the lobe 914 bends as shown and the resisting element 960 prevents an undesirable collapse or kink in the bend region 980. In this embodiment, the resisting element 960 is an undulating metal wire or polymer rod that is adhered to the carrier wires by welding, soldering or adhesives. In another embodiment, the resisting element can be separated from (not adhered to) the carrier as shown and described. In general, the resisting element works in concert with the carrier when both are molded into the weather seal—with the resisting element providing a further band of reinforcement (against expansion and compression as described herein) to the seal along the desired axis.

It should be clear that the expansion and compression resisting element(s) are located along the wire carrier at one or more position(s) (refer to FIGS. 13 and 14 below) on the carrier's width that facilitates a collapse-free bend around the underlying auto body mounting fin. The resisting element position(s) can be determined by general guidelines based upon the seal profile or by trial and error.

Figure 10:
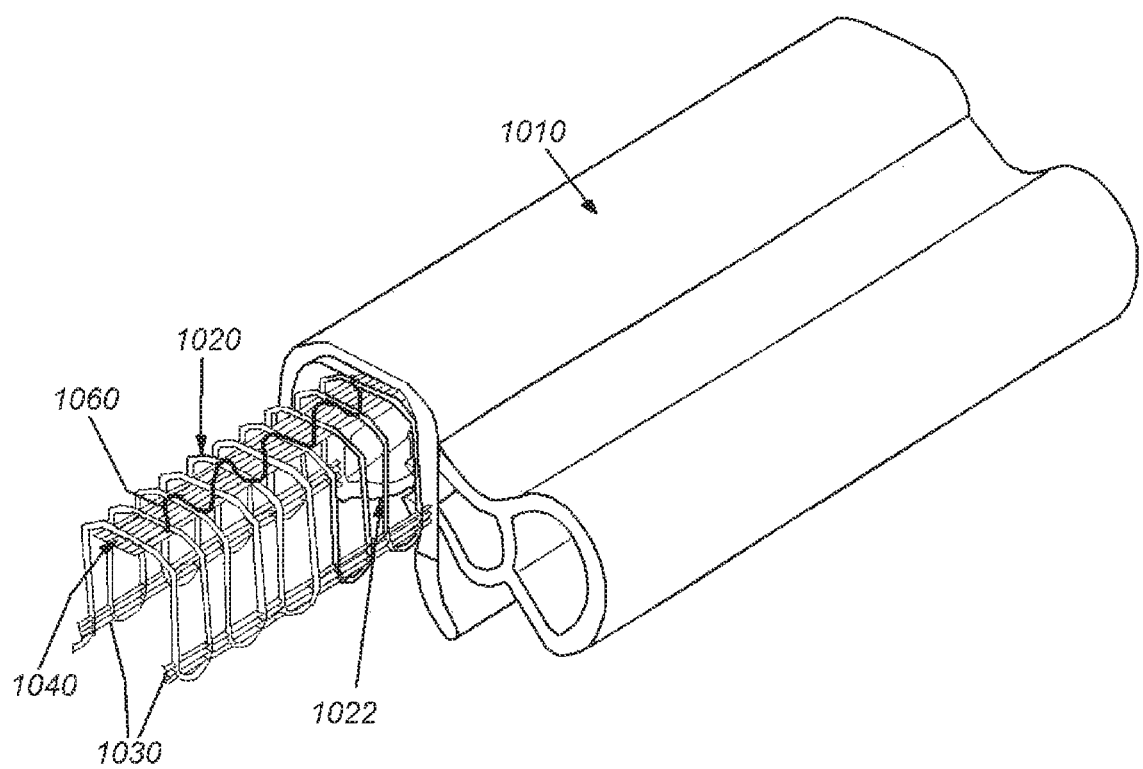
FIG. 10 is a fragmentary, exposed perspective view of a weather seal (e.g. the automotive door seal FIG. 9) with a molded-in, folded wire carrier that includes an expansion and compression resisting element according to an embodiment arranged along a top (bottom of the U-shape) of the folded wire carrier, which is free of collapse and kinks at a bend, and illustrating the selective placement of the element at various locations of the carrier.

As shown in FIG. 10, the weather seal 1010 (e.g. an exemplary door seal) includes a molded-in wire carrier 1020 according to the embodiments described herein with an expansion and compression resisting element 1060 located generally along the top of the U-shape, so that it resides in the top of the seal channel 1022. In this embodiment, the resisting element 1060 is an undulating wire that can be soldered, adhered, or spot-welded (among other attachment mechanisms) to the wire carrier, or woven through the wire carrier, in the region of the top/center grouping of warp yarns 1040. The side yarns 1030 are free of any expansion and compression resisting elements in this embodiment allowing these axes to stretch or compress upon bending of the weather seal. The placement of the resisting element 1060 places it adjacent to the top of the channel 1022, in close proximity to the mounting fin of the auto body. It thereby conforms to the curves of the body (providing a spine), while allowing controlled expansion and compression along the remote sides of the channel 1022 to accommodate bends relative to curves of the body door opening.

Figure 1:
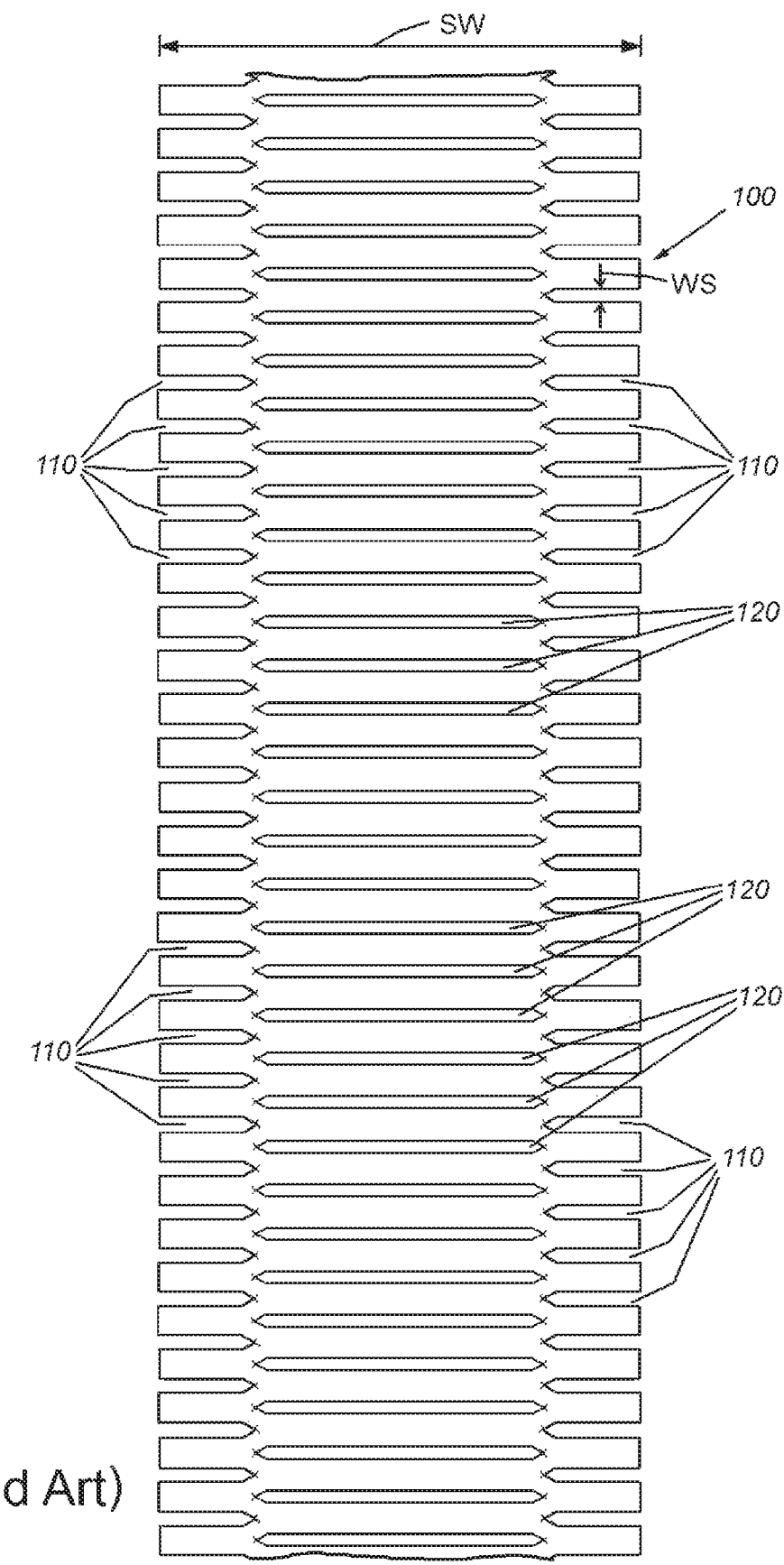
FIG. 1 is a diagram of a perforated steel strip used to reinforce an elastomeric weather seal according to the prior art.
Figure 11:
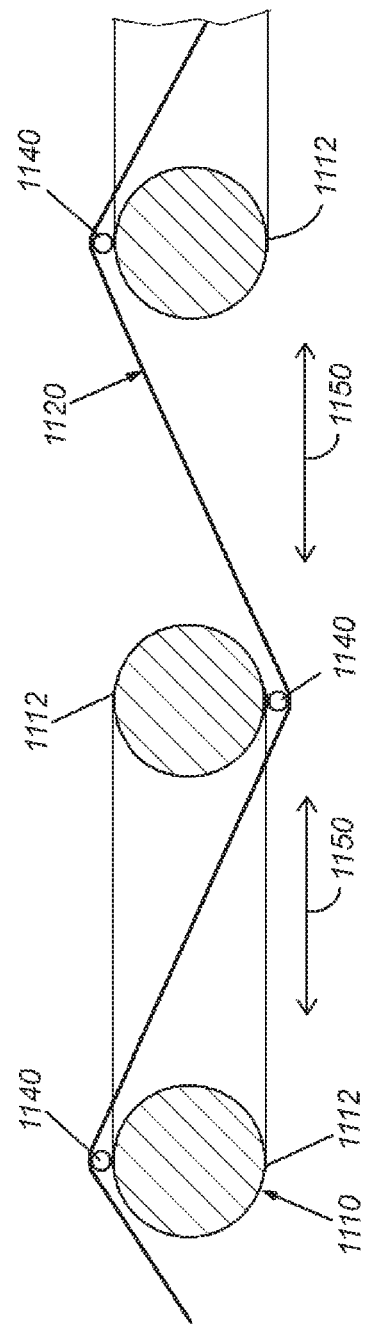
FIG. 11 is a side cross section of an exemplary wire carrier with an expansion and compression resisting wire that defines a sinusoidal shape, engaging opposing sides of adjacent carrier wires (weft)

FIG. 11 shows a cross section depicting the generalized geometry of an expansion and compression resisting element (a wire 1120) with respect to the wire carrier 1110. As shown, the wire 1120 is woven above and below adjacent carrier wires 1112 in a sinusoidal manner. This provides a secure attachment that can afford limited compression or expansions (double arrows 1150) of the carrier wires 1112 with respect to each other, thereby limiting collapse of the overall structure and providing similar or better performance and cost-effectiveness relative to the above-described pierced and stretched steel strip of the prior art (FIG. 1). A spot weld 1140 or other attachment mechanism can be used to secure the resisting element (wire) 1120 to the carrier wire 1112.

Figure 12:
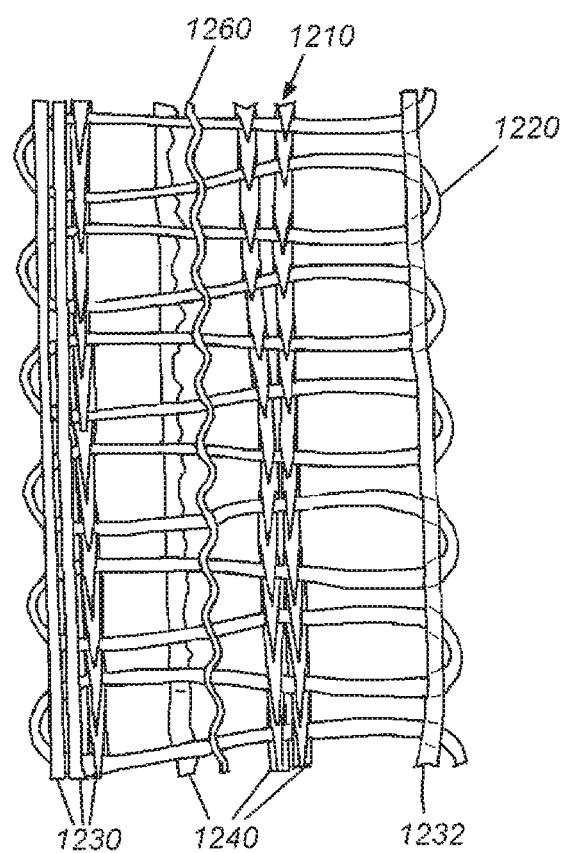
FIG. 12 is a fragmentary view of a wire carrier with an expansion and compression resisting wire according to the arrangement of FIG. 11, spot welded to each carrier wire.

The arrangement of FIG. 11 is shown in the diagram of FIG. 12 in an unfolded configuration. This unfolded arrangement 1210 includes a serpentine or zig-zag (also propeller-shaped in this example) wire carrier 1220. The carrier supports warp yarns 1230 and 1232 on each of opposing ends and a plurality of central warp yarns 1240 that reside at the top of the U-shaped channel when the carrier is folded into a final shape for molding into a weather seal. Among the central yarns 1240 resides the expansion and compression resisting element (wire) 1260 that is secured by (e.g.) spot welds to opposing sides of adjacent carrier wires.

Figure 13:
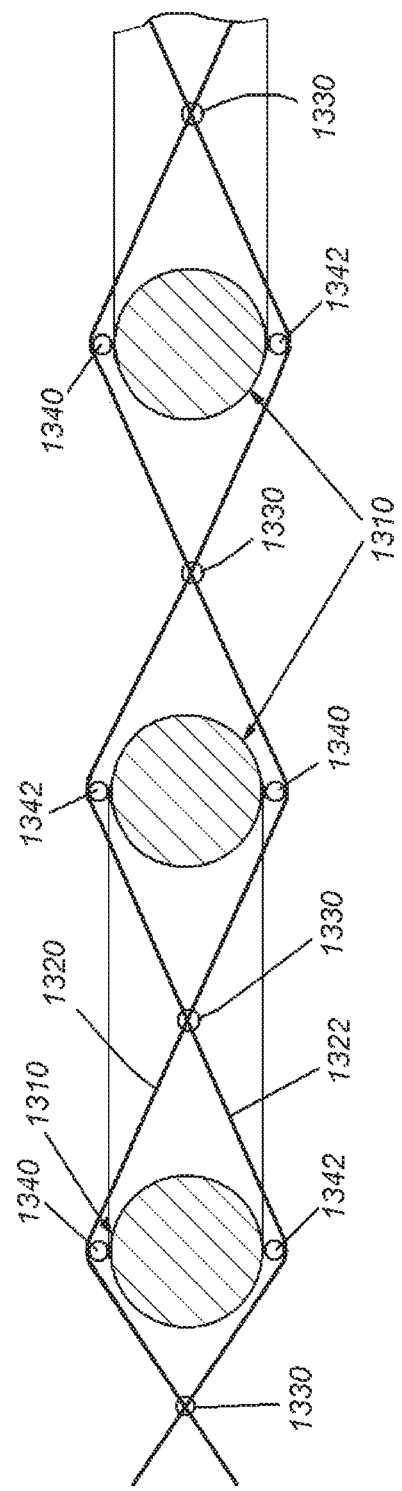
FIG. 13 is a side cross section of an exemplary wire carrier with a pair of expansion and compression resisting wires that each define a sinusoidal shape, engaging opposing sides of adjacent carrier wires.

The arrangement of FIGS. 11 and 12 can be modified to include two expansion and compression resisting wires as shown in FIG. 13. The carrier wire 1310 is engaged by opposing undulating resisting element wires 1320 and 1322 that cross at points 1330 and can be each secured to the carrier wires at opposing locations using spot welds, adhesives, or other mechanisms 1340 and 1342 (respectively). The element wires 1320 and 1322 can overlap at the crossing points 1330 and can be unattached, or welded or otherwise adhered together at the crossing points 1330. This arrangement provides a secure and balanced structure to resist compression and expansion between carrier wires.

Figure 14:
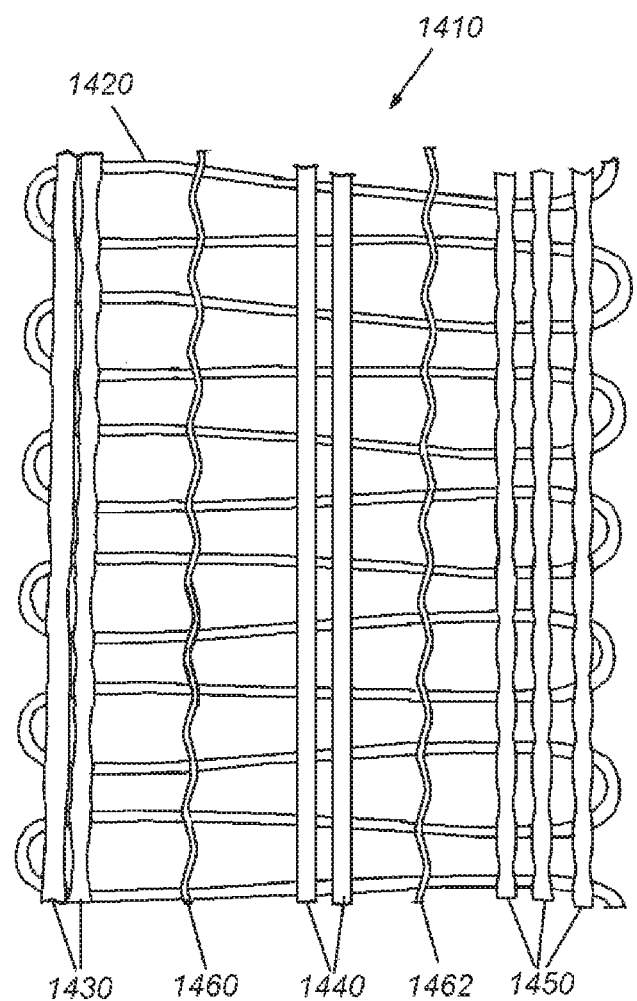
FIG. 14 is a fragmentary view of a wire carrier with two spaced-apart expansion and compression resisting wires according to an alternate embodiment.

Reference is made to FIG. 14, showing a wire carrier 1410 in which a wire weft 1420 is secured by woven warp yarns 1430, 1440 and 1450. In this embodiment, a plurality of yarns 1450 are biased along one edge of the carrier 1410 to accommodate the geometry of the associated weather seal. As described generally herein, placement of yarns can be used to affect the bending and reinforcing characteristics of the carrier when folded and molded into the seal. The depicted embodiment includes a pair of spaced-apart reinforcing element (metal wires) 1460 and 1462. These wires are located on each of opposing sides of the central warp yarns 1440 and can reside on the top, or on opposing sides (adjacent to the top side), of the U shape when the carrier is folded. In this embodiment, the resisting element wires can be spot welded (or otherwise adhered) to the wire weft 1420. Alternatively, one or both resisting wires 1460, 1462 can float (non-attached) with respect to the weft 1420. As depicted (like FIG. 13), each wire contacts an opposing side of the respective wire weft. In general, this arrangement consists of two sinusoidally shaped wires in which one wire contacts a first side of a respective weft and the other wire contacts an opposing side of the respective weft in a manner in which the first wire is (loosely stated) 180-degrees out-of-phase with respect to the second wire.

Figure 15:
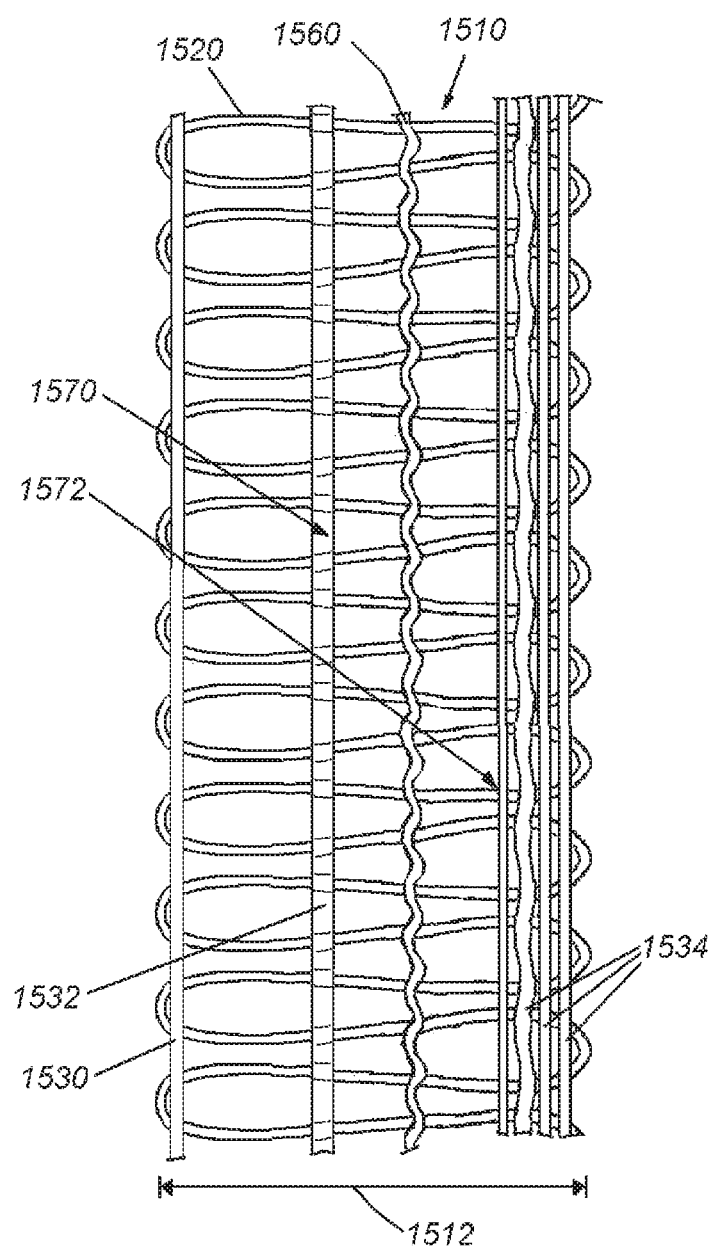
FIG. 15 is a fragmentary view of a narrow wire carrier with a reduced number of warp yarns including a central expansion and compression resisting element (wire) adhered to the weft and a pair of flanking reinforcing fibers placed among the warp yarns for greater elongation resistance.

FIG. 15 is a diagram of a wire carrier 1510 having an expansion and compression resisting element (wire) 1560 that is incorporated into to the wire weft 1520 according to the principles herein. By way of non-limiting example, the wire 1560 is secured to the weft 1520 using spot welding. The overall width 1512 of the carrier 1510 is narrower than the typical carrier described above. For example, it can be less than 1.4 inches. As such, the number of warp yarns 1530, 1532 and 1532 has been significantly reduced from the wider versions described above. The reduction in the number of warp yarns can compromise the carrier's elongation resistance. Thus, in an embodiment, a pair of reinforcing fibers (e.g. monofilament polymer, fiberglass and/or aramid) 1570 and 1572 are located among the yarns 1532 and 1534, respectively. These reinforcing fibers can be lockstitched to, or simply laid atop, the wire weft (in a manner that adheres them when the overcoat of latex is applied to the carrier as it is woven). The denier (diameter) of the fiber(s) is highly variable—it can be similar to or smaller than that of the yarns and/or wire 1560. Likewise, the number of fibers and their placement is highly variable. In general they can be applied where a reduced number of yarns is present (if reinforcing is required).

In an embodiment, the carrier according to various embodiments can have a width (between opposing ends of the serpentine/zig-zag shape) of approximately 1.4-1.6 inch and approximately ten carrier wires (weft) per inch. The carrier wire can be 0.020 inch in diameter and constructed from SAE 1010 drawn steel or equivalent. Other materials, such a thermoplastic can be employed in alternate embodiments to construct the carrier instead of a metal wire. Resisting element wires can be constructed from drawn steel. The diameter of expansion and compression resisting element wire(s) is highly variable. In an embodiment, the wire of the resisting element can define a diameter of between approximately 0.02 and 0.05 inch (approximately 0.5 millimeters to 1.15 millimeters). In general the wider the unfolded carrier, the larger the diameter of the resisting element wire, so as to provide desired tensile strength. Note that, where other materials (e.g. a polymer) or cross sectional profiles (e.g. a flat strip) are used for the resisting element, the dimensions can be sized to provide sufficient tensile strength/performance to the material.

While a metal (e.g. steel) wire is employed as the expansion and resisting element in various embodiments herein, in alternate embodiments a fiberglass yarn or cord, an aramid (e.g. Kevlar®) material, a variety of solid or braided metals/alloys (e.g. aluminum, copper, brass, titanium, stainless steel, etc.) and/or certain polymers (e.g. monofilament polyester or polypropylene) and/or combinations of such materials can be employed. In the illustrative embodiment, solid core low carbon steel is employed.

It should be clear that the wire carrier constructed in accordance with the embodiments herein provides superior performance in resisting both short-term and long-term compression and expansion, and is relatively straightforward to manufacture using conventional knitting machinery. Moreover, the placement of the expansion and compression resisting element(s) along the width of the wire carrier can be tailored to the bending characteristics of the weather seal so as to ensure a smooth, kink-free surface when fitted to a mounting fin on the vehicle opening or door (or the interface of another type of object, such as an appliance door, structural hatchway, etc.).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. As an alternative, the wire or other resisting element can be located variably across the width of the carrier depending upon the geometry of the finished weather seal. For example, the wire can be attached near one edge of the carrier along a given length of the seal, a central location along another length of the overall seal and an opposing edge at yet other locations along the length of the weather seal. By way of example, the wire can extend diagonally (or according to another non-perpendicular and/or non-linear pattern) relative to the parallel carrier wires. Accordingly, this description is meant to be taken only by way of example, and not to otherwise limit the scope of this invention.

What is claimed is:

1. A knitted wire carrier for use in a weather seal comprising:
    a wire weft formed in a serpentine pattern and defining a width between alternating edge bends perpendicular to an elongated length;
    a plurality of knitted warp yarns extending in the direction of the elongated length and located at positions along the width of the wire weft; and
    at least a first expansion and compression resisting element provided at a location along a width of the weft that generates a desired bending characteristic in the weather seal that is substantially free of collapse.

2. The knitted wire carrier as set forth in claim 1 wherein the wire weft comprises a steel wire and the first expansion and compression resisting element comprises a steel wire.

3. The knitted wire carrier as set forth in claim 1 wherein the first expansion and compression resisting element comprises a strip defining a width thereof greater than a thickness thereof.

4. The knitted wire carrier as set forth in claim 1 wherein the wire carrier is coated with an adhesive material that maintains the warp yarns in a desired position on the wire weft.

5. The knitted wire carrier as set forth in claim 4 wherein the adhesive material comprises a latex coating.

6. The knitted wire carrier as set forth in claim 1 further comprising at least a second expansion and compression resisting element.

7. The knitted wire carrier as set forth in claim 6 wherein the first expansion and compression resisting element comprises a wire arranged in a woven, sinusoidal pattern with respect to adjacent wire wefts and the second expansion and compression resisting element comprises a wire arranged in an opposite woven, sinusoidal pattern that is 180 degrees out-of-phase with respect to the wire wefts relative to the first expansion and compression resisting element.

8. The knitted wire carrier as set forth in claim 6 wherein the second expansion and compression resisting element is located at a spacing along the width of the wire weft from the first compression and expansion-resisting element.

9. The knitted wire carrier as set forth in claim 1 wherein the first expansion and compression resisting wire is approximately centered along the width of the wire carrier.

10. The knitted wire carrier as set forth in claim 1 wherein the first expansion and compression resisting wire is located off-center relative to the width of the wire carrier.

11. The knitted wire carrier as set forth in claim 10 wherein the first expansion and compression resisting element is located, when the wire carrier is folded into a U-shape, adjacent to a side of the folded U-shape.

12. The knitted wire carrier as set forth in claim 1 wherein the first expansion and compression resisting wire is constructed from a non-metallic material.

13. The knitted wire carrier as set forth in claim 1 wherein the first expansion and compression resisting element is adhered to the wire weft.

14. The knitted wire carrier as set forth in claim 13 wherein the first expansion and compression resisting element is adhered by at least one of welds, spot welds, solder, adhesive, fusion and lockstitching.

15. A weather seal including the knitted wire carrier of claim 1 folded into a U-shape to reinforce a mounting channel of the weather seal.

16. The weather seal as set forth in claim 15 constructed and arranged for attachment in at least one of a vehicle and a moisture-tight cabinet.

17. The weather seal as set forth in claim 15 further comprising at least one reinforcing fiber located adjacent to at least one of the warp yarns that provides enhanced elongation resistance due to an absence of a sufficient number of warp yarns.

18. The weather seal as set forth in claim 15, wherein at least the first expansion and compression resisting element is interwoven with at least one warp yarn.

\* \* \* \* \*